United States Patent [19]
Gareis et al.

[11] Patent Number: 5,557,698
[45] Date of Patent: Sep. 17, 1996

[54] COAXIAL FIBER OPTICAL CABLE

[75] Inventors: Galen M. Gareis, Richmond, Ind.; Barry Thornton, Auston, Tex.

[73] Assignee: Belden Wire & Cable Company, Richmond, Ind.

[21] Appl. No.: 292,314

[22] Filed: Aug. 19, 1994

[51] Int. Cl.⁶ ........................................ G02B 6/44
[52] U.S. Cl. ...................... 385/101; 385/100; 385/103
[58] Field of Search .................................. 385/101, 100, 385/102, 103, 113

[56]  References Cited

U.S. PATENT DOCUMENTS

| | | | |
|---|---|---|---|
| 4,579,420 | 4/1986 | Winter et al. | 385/113 |
| 4,695,127 | 9/1987 | Ohlhaber et al. | 385/101 |
| 4,896,939 | 1/1990 | O'Brien | 385/101 |
| 5,150,442 | 9/1992 | Desmons | 385/101 |
| 5,268,971 | 12/1993 | Nilsson et al. | 385/101 |

Primary Examiner—Rodney B. Bovernick
Assistant Examiner—Phan T. H. Palmer
Attorney, Agent, or Firm—Laff, Whitesel, Conte & Saret, Ltd.

[57]  ABSTRACT

A coaxial fiber optic cable which includes a core having a transmission medium that includes at least one optical fiber surrounded by one or more strengthening materials and enclosed by a core jacket. A first electrical conductor i.e., a copper braid surrounds the core jacket and is coaxial with the core jacket. A second electrical conductor, i.e., copper braid, is coaxial to the first conductor. The first and second copper braids are triaxial with the core jacket and are separated by a dielectric which extends between and in parallel relation to the length of the braids. An overall aramid reinforcement layer(s) is in the core and surrounds the optical fiber(s). An outer cable jacket surrounds the second electrical conductor and encloses the cable.

15 Claims, 4 Drawing Sheets

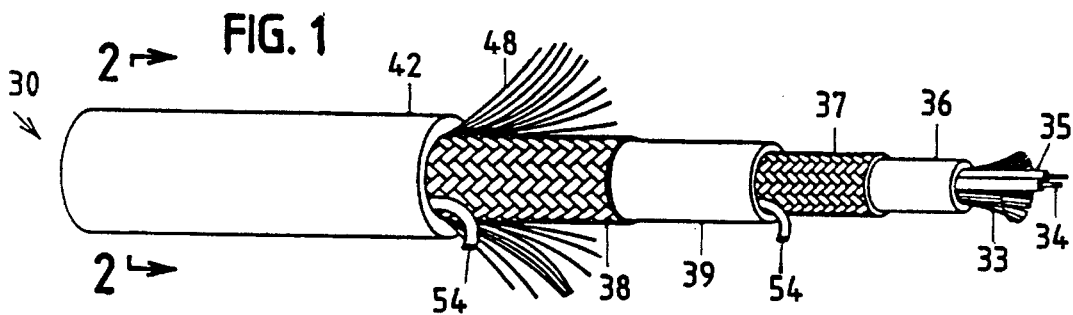
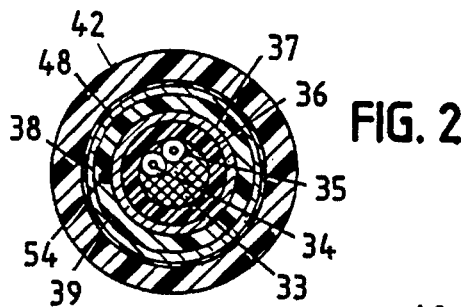
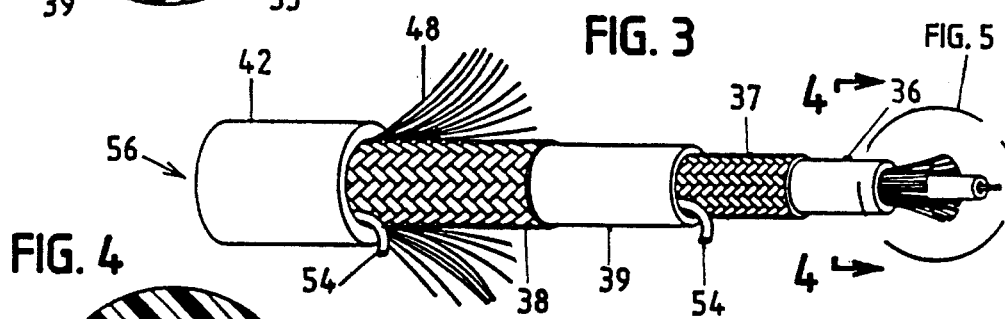
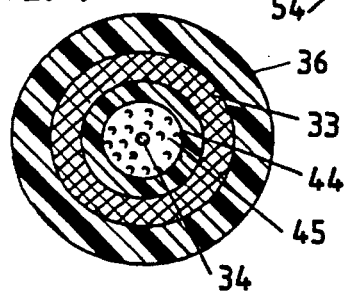
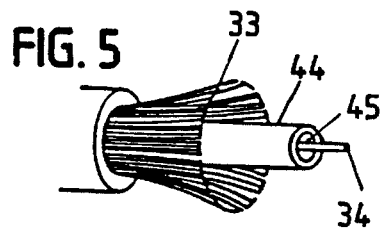
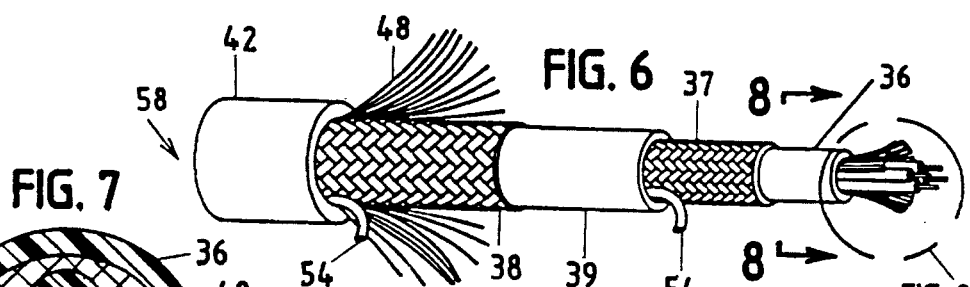
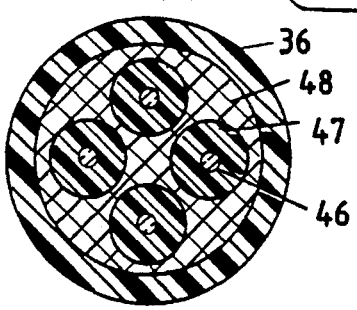
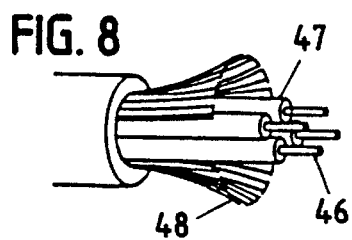

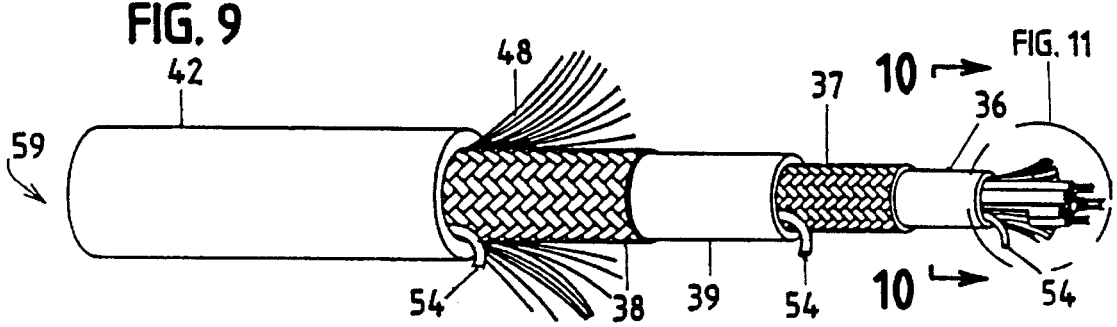
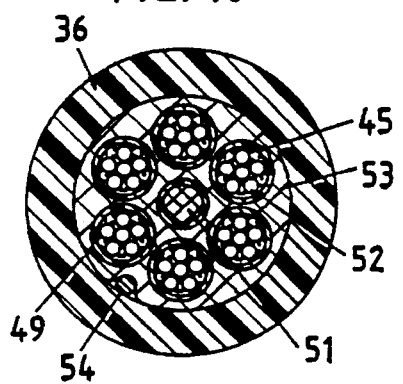
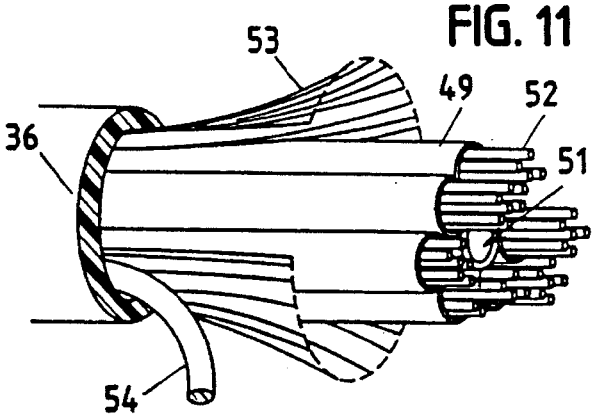
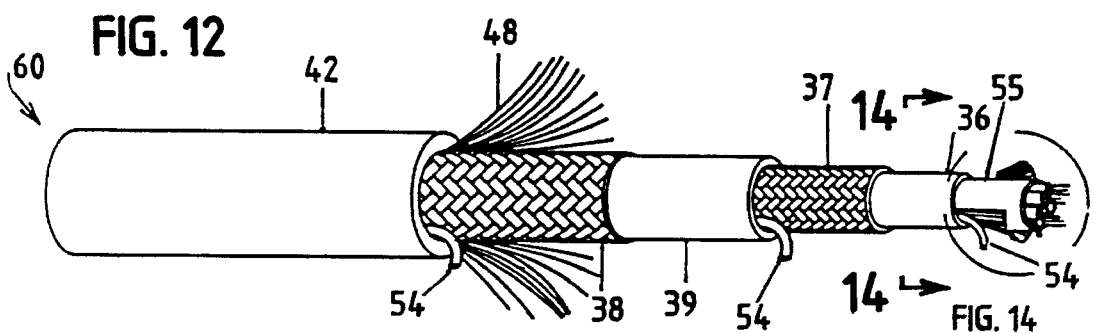
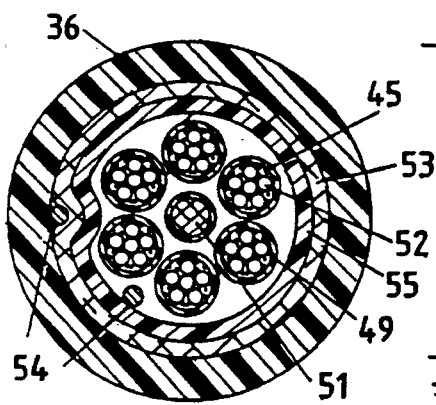
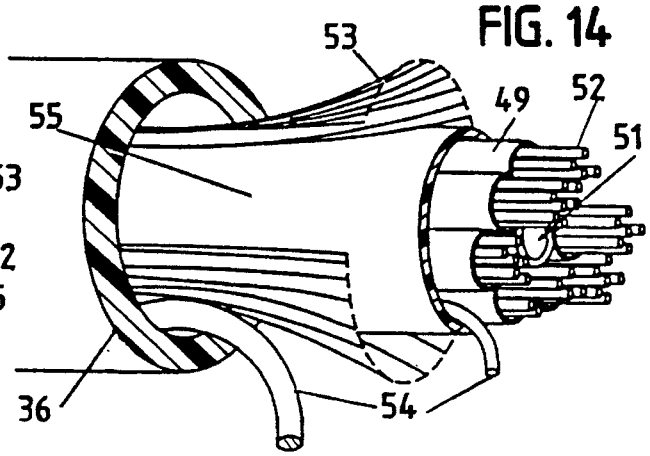

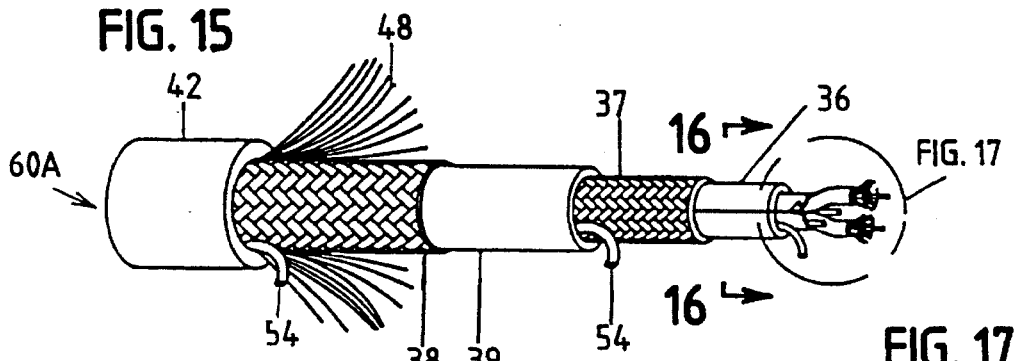
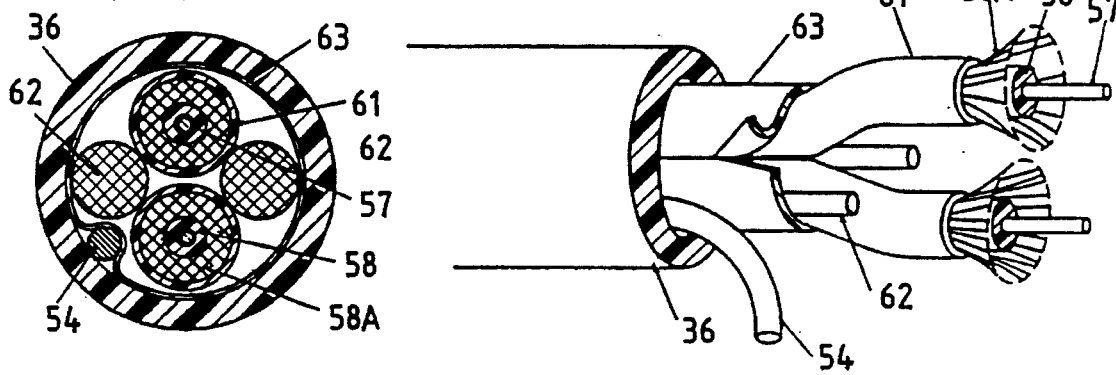
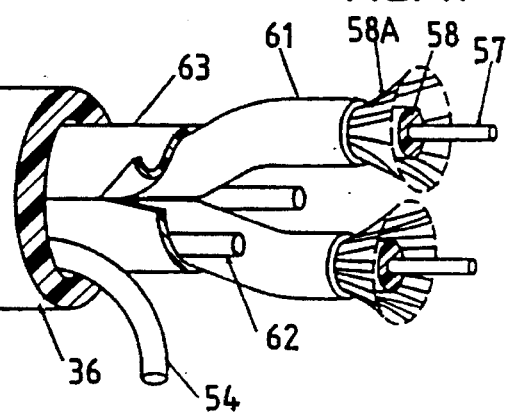
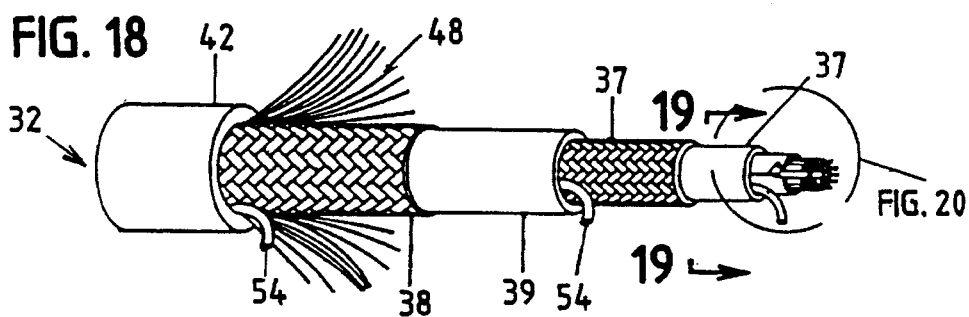
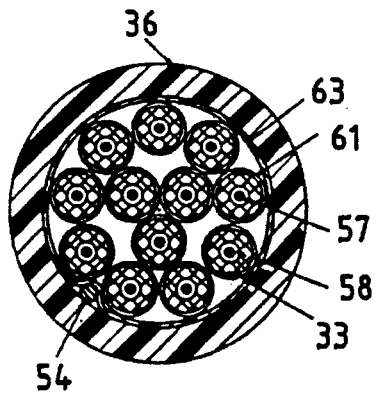
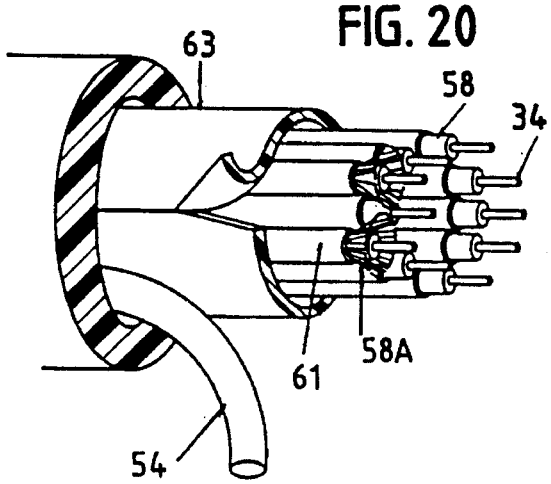

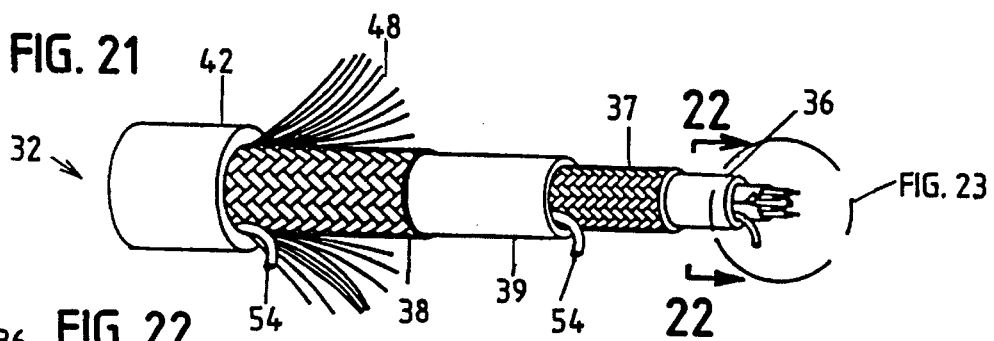
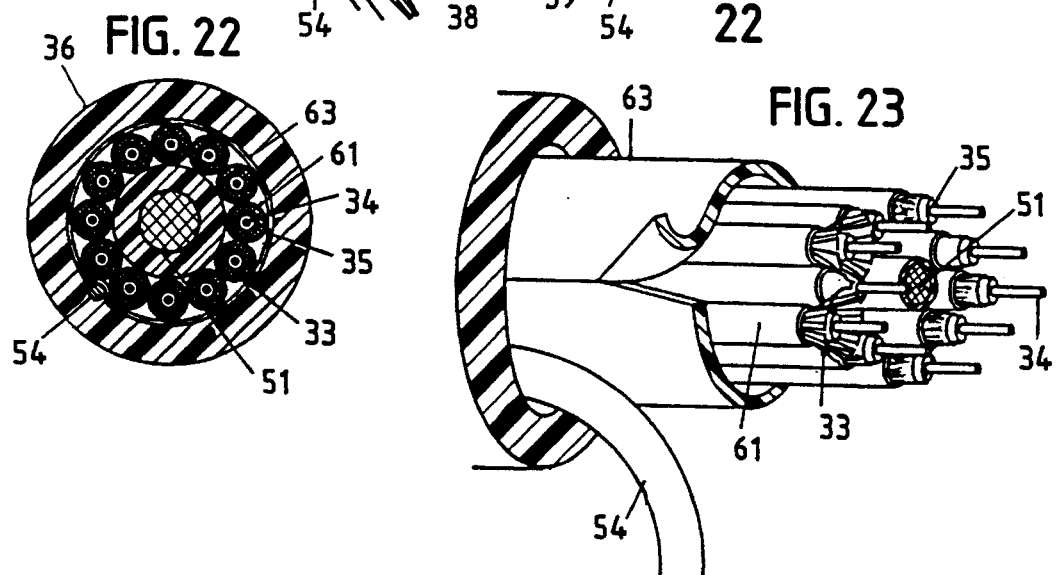
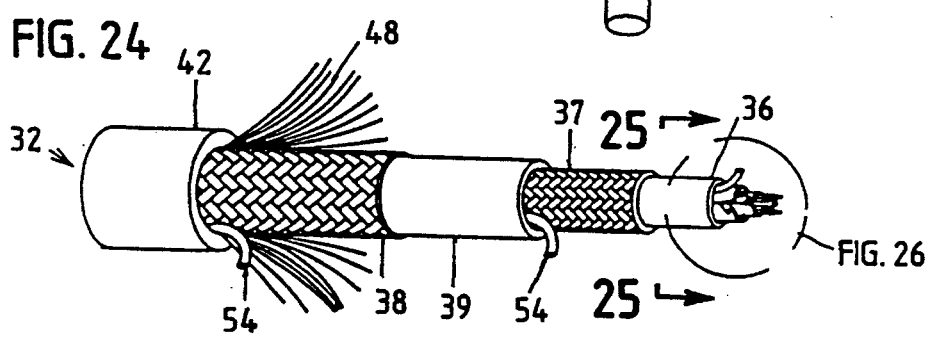
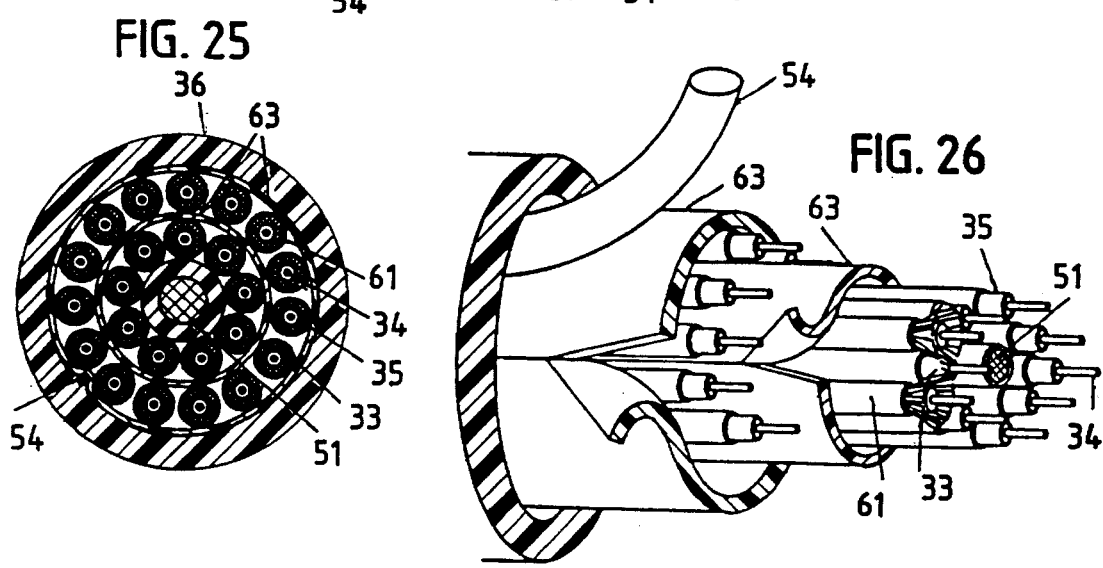

COAXIAL FIBER OPTICAL CABLE

This invention relates to coaxial fiber optic cables. More particularly, this invention relates to coaxial fiber optic cables having a fiber optic core surrounded by two coaxial electrical conductors.

BACKGROUND OF THE INVENTION

Electric power is delivered as direct current (DC) or as alternating current (AC). Direct current involves transferring electric power in the form of an electron current flow which consists of electrons migrating through a conductor under the influence of an electromotive force known as voltage potential. In contrast, alternating current transfers electric power in the form of a space-time distortion known as a Transversal Electro-Magnetic Wave which is located and travels within the area between the conductors.

Alternating current preferably is used over direct current for sending electric power through an electrically conductive wire or cable system. This is because the flow characteristics of the alternating current may be transformed by a transformer to optimize the use (and losses) in the conductor(s) in the electrically conductive wire or cable system. As a result, the standard power distribution system in the United States involves using alternating current which operates at a frequency of 60 cycles per second(Hertz). Power transformers located on the ground and on poles convert the relatively high voltage power of the alternating current transmitted through the cross-country lines (upwards of 500,000 volts) to a more practical 120 volts such as, for example, would be used in the home.

As the alternating current frequency of electric power is raised, the size of the transformer becomes smaller. For example, the electrical power in aircraft is run at 400 Hertz and not at 60 Hertz as in the home. This higher frequency means that the transformers are smaller and lighter and, therefore, more suitable for transport on aircraft. In addition, as the frequency of the electrical power increases, the physical construction of the power cable must change. Specifically, high frequency electrical energy is served best by a coaxial cable construction as the electrical power wave may be completely contained within the cable structure. Furthermore, coaxial cables ensure that energy does not leak out of the cables and become wasted radiated electromagnetic power.

Thus, not only is power transfer more efficient with coaxial cables, but they do not contaminate the local environment with electrical or radio noise. Coaxial cables are also inherently round and symmetrical about their central axes which enables them to pull into job sites easily and fit through grommets and fittings without problems. Coaxial cables generally do not include fillers or artificial shaping material. Thus, coaxial cables are presently used to transmit power or data in the electric domain. Specifically, metal, i.e., copper coaxial cables are used to transmit electric power or data (analog or digital). In contrast, fiber optic cables are used to transmit high speed fiber optic data. Both types of cables are often simultaneously needed for a specific use. Thus, efforts have been made to combine a mixture of individual metal cables and fiber optic cables within a single cable construction. This involves positioning a mixture of individual copper and fiber optic cables into one jacket. This type of construction is shown on page 210 of the 1992 Belden Master Catalog.

While the above-described cable includes both individual metal and fiber optic cables that are combined into a single cable construction, there are problems associated with its use. First, the cable jacket generally is not effective for retaining the symmetrical and round shape of the cable. Such a lack of symmetry in the shape of the cable interferes with cable usage.

As previously mentioned, a symmetrical and round cable construction is essential to effective usage of the cable. Thus, a cable without such a construction does not permit the cable to be used in some instances.

Second, packaging a mixture of individual metal insulated conductors and fiber optic cables into a single cable construction is both time-consuming and costly.

SUMMARY OF THE INVENTION

Accordingly, it is an object of the present invention to provide a coaxial fiber optic cable within a single cable construction.

It is another object of the present invention to provide a round coaxial fiber optic cable having a fiber optic core and a pair of spaced coaxial electrical conductors coaxial with the core to provide a symmetrical cable construction.

It is yet another object of the present invention to provide a coaxial fiber optic cable having a fiber optic core with at least one optical fiber and a pair of coaxially spaced copper conductors which are triaxial with the core and which permits the combination of fiber optic and electric data (analog or digital) conduction in the same cable construction.

The objectives and advantages of the present invention are achieved, in a preferred embodiment, by providing a cable which includes a pair of spaced copper coaxial conductors and a fiber optic transmission member as the center core of the cable.

Specifically, the inventive cable includes a core with at least one optical fiber conductor which is surrounded by one or more strengthening materials and enclosed by a core jacket. An inner first electrical conductor surrounds the core and extends longitudinally within and parallel to the length of the cable. The inner first electrical conductor is preferably a cylindrical braided copper conductor. An outer second electrical conductor is radially spaced from and surrounds the inner first electrical conductor and extends coaxially with and in parallel relation to the inner first electrical conductor. Similarly, the outer electrical conductor is preferably a cylindrical braided copper conductor. A cylindrical dielectric separates the inner electrical conductor from the outer electrical conductor and extends between and in parallel relation to the length of the inner and outer electrical conductors. Optionally, a reinforcement layer surrounds and extends in parallel relation to the outer electrical conductor. An outer jacket surrounds the outer electrical conductor or reinforcement layer and encloses the inner and outer electrical conductors.

The inventive cable will largely be used in telecommunications for combining broadband and fiber optic digital signals. The cable has particular use as an electronic news gathering camera cable extension lead with fiber video signal links and metal, i.e., copper instrumentation and/or power links. Presently, in the telecommunications market, there is a proposal to combine broadband RF (all standard cable television channels) with interactive digital. However, incorporating standard television cable on fiber is not cost effective and using FM or digital restricts the number of available channels.

The inventive cable will also be extensively used in fiber computer networks. Specifically, there are two major applications in this area. First, the inventive cable will be used as a redundant network path in computers. Currently, the high speed fiber system in a single cable is backed up with a lower speed copper cable. The inventive cable would generate the same labor cost for installation and would require about the same duct space as a free back-up or alternative data line. Also, the inventive cable will provide power to the high frequency electrical power nodes on fiber optic computer networks which is essential for getting data on and off the fiber. A fiber optic cable alone is insufficient for providing power to the nodes on the line of a fiber optic computer network. If the nodes do not receive local electrical power from another source, they will not pass on the data. Thus, the use of high frequency electrical power in the same cable will make the fiber connectivity network independent of local conditions.

Other applications for the inventive cable include the following. In broadcasting, the inventive cable means higher performance and less bulk for sporting events, concerts, electronic news, and the like. Moreover, all the high speed digital video, audio, intercom, and monitoring data can be easily transmitted on the fiber, and control/power for the camera can be transmitted on the coaxially placed conductors. In the area of exploration, the inventive cable will be useful for powering and carrying data from hydrophones or geophones collecting data for oil, mineral, and scientific exploration. In the area of security, the inventive cable will be useful for powering and carrying data from security cameras, intrusion detectors, and alarms to pressure, acoustic, and temperature sensors on pipes and in reactors and will further make possible self-contained closed systems. The cable will additionally be useful in safety systems in buildings which should be independent from the rest of the communication and security systems of the buildings. In the area of aircraft, military, and aerospace, combining power and wide band data will reduce the weight and space requirements in these areas. In the area of building intelligence, the computer control of all services and environmental attributes is more cost-effective with the use of the inventive cable.

Thus, the inventive cable offers a wide range of current and future uses. A preferred specific configuration has central fiber optic transmission core containing one or more optical fibers. The transmission core is defined by a tubular dielectric first core jacket. A first cylindrical metal conductor, i.e., a copper braid, copper foil or combination of the two surrounds the first dielectric jacket and is coaxial with the transmission core. A tubular dielectric material surrounds the first electrical conductor. A second metal conductor, i.e., a copper braid, copper foil or combination of the two, surrounds the tubular dielectric and is triaxial with the transmission core. A jacket surrounds the second copper braid. Reinforcement buffer material generally surrounds each optical fiber.

It is specifically the aforementioned construction of the cable which results in a cable with a high flexibility torque balanced design. The outer jacket and dielectric between the braided copper conductors provides superior abrasion and insulation resistance levels. Moreover, the optical fiber in the cable core provides exceptional band width. The cable can have high flexibility at low temperatures, is extremely compact, and has superior video quality. The cable includes a high overall tensile strength and high crush resistance. The cable does not include signal path ground loops.

Other objects and advantages of the invention will become apparent from the following detailed description taken in conjunction with the drawings.

BRIEF DESCRIPTION OF THE DRAWINGS

FIG. 1 is a partial side perspective view of fiber optic cable of the present invention.

FIG. 2 is an enlarged cross-section view taken along lines 2—2 of FIG. 1.

FIG. 3 is a partial side view of another fiber optic cable of the present invention.

FIG. 4 is an enlarged cross-section view taken along lines 4—4 of FIG. 3.

FIG. 5 is an enlarged view taken along line 5 of FIG. 3.

FIG. 6 is a partial perspective side view of still another cable of the present invention.

FIG. 7 is an enlarged cross-section view taken along lines 7—7 of FIG. 6.

FIG. 8 is an enlarged view taken along line 8 of FIG. 6.

FIG. 9 is a partial perspective side view of another fiber cable of the present invention.

FIG. 10 is an enlarged cross-section view taken along lines 10—10 of FIG. 9.

FIG. 11 is an enlarged view taken along line 11 of FIG. 9.

FIG. 12 is a partial side view of another fiber cable of the present invention.

FIG. 13 is an enlarged cross-section view taken along lines 13—13 of FIG. 12.

FIG. 14 is an enlarged view taken along line 14 of FIG. 12.

FIG. 15 is a partial perspective side view of still another fiber cable of the present invention.

FIG. 16 is an enlarged cross-section view taken along lines 16—16 of FIG. 15.

FIG. 17 an enlarged view taken along line 17 of FIG. 15.

FIG. 18 is a partial side view of still a further fiber cable of the present invention.

FIG. 19 is an enlarged cross-section view taken along lines 19—19 of FIG. 14.

FIG. 20 is an enlarged view taken along line 20 of FIG. 18.

FIG. 21 is a partial side view of another fiber cable of the present invention.

FIG. 22 is an enlarged cross-section view taken along lines 22—22 of FIG. 21.

FIG. 23 is an enlarged view taken along line 23 of FIG. 21.

FIG. 24 is a partial side view of another fiber cable of the present invention.

FIG. 25 is an enlarged cross-section view taken along lines 22—22 of FIG. 21.

FIG. 26 is an enlarged view taken along line 26 of FIG. 24.

DETAILED DESCRIPTION OF THE INVENTION

Generally referring to FIGS. 1 and 2, in a preferred embodiment we provide a coaxial optic fiber cable 30. The cable has a central substantially cylindrical dielectric jacket 36. The jacket 36 defines a central substantially cylindrical fiber optic core. The fiber optic core contains a fiber optical transmission medium. <Various types of optic fibers and their fiber optic core construction are shown in Belden, Inc. 1993 Fiber Optic Catalog.>

In FIGS. 1 and 2, the transmission medium is a pair of optical fibers 34 each having a buffer coating or tight buffer wrap 35.

Circumferentially surrounding the pair of buffer wrapped optical fibers is a strength member 33. The strength member 33 is preferably a serve of aramid yarn sold under the trademark Kevlaror, a combination of fiberglass epoxy rods with aramid yarn. Other appropriate strength materials may be used. The strength member 33 contacts and holds the buffered optical fibers and adds tensile strength and protection to the optical fibers. The jacket 36 is made of any suitable material, i.e., polyvinyl chloride, polyethylene, fluorinated ethylene propylene, Hypalon, fiberglass, fluorocopolymers, tetrafluoroethylene, flame retardant polyurethane, etc. The inner diameter of the fiber optic jacket 36 defines the fiber optic core 32.

The fiber optic jacket 36 is surrounded by a first or inner cylindrical braided electrical conductor 37 and a second or outer coaxial electrical conductor.

The electrical conductors are metal conductors and for an electronic news camera cable extension lead with fiber video signal links and copper instrumentation links, the electrical conductors 37 and 38 are preferably braided copper wires, copper foil or a combination of the two. The coaxial electrical conductors 37 and 38 are configured in a triaxial construction with fiber optic core and are separated from one another by a dielectric 39.

The dielectric 39 may be any suitable dielectric used in normal coaxial cables, i.e., polyethylene, polypropylene, foamed polyethylene, foamed polypropylene, flame retardant foamed or unfoamed polyethylene, foamed or unfoamed fluorinated ethylene propylene, tetrafluoroethylene, etc. The dielectric provides abrasion resistance and insulation.

Surrounding the outer conductor 39 is strength member 48. Strength member 48 is preferably aramid yarn or a combination of aramid yarn and fiberglass epoxy rods. As with strength member 33, other appropriate strength materials may be used.

Surrounding the strength member 48 and the outer coaxial conductor 38 is an outer dielectric jacket 42.

The outer jacket 42 can be made of the same material as jacket 36. However, for safety purposes, it is preferred that the outer jacket is made of a flame retardant composition such as flame retardant polyurethane.

Preferably, both the jackets 39 and 42 have at least one longitudinally extending ripcord 54 positioned between the jacket and the coaxial conductor 37 and 38.

FIGS. 3–5 illustrate another embodiment of the present invention. In this embodiment and subsequent embodiments, we use identical numbers to identify similar structures. FIGS. 3–5 illustrate a coaxial fiber optic cable 56 having a fiber optic core formed by the jacket 36. The fiber optic core contains a single optical fiber 34 surrounded by a plastic buffer tube 44 filled with gel 45. This construction is well known and the materials used for the gel and buffer tube are those generally used for this type of fiber optic construction. For instance, the gel may be synthetic oil-based, inorganically-gelled grease, and the buffer tube may be made from polybutadiene terephthalate (PBT). Substantially concentric with the plastic buffer tube is the cylindrically wrapped strength member 33 and the cylindrical fiber optic jacket 36. The strength member 33 as shown in FIGS. 4 and 5 is an aramid fiber tape woven around the buffer tube 44. The remaining structure of the coaxial fiber optic cable is the same as is in FIG. 1. That is, there are the cylindrical inner conductor 37, dielectric jacket 39 surrounds the conductor 37, ripcord 54 is between the conductor 37 and jacket 39, the outer coaxial conductor 38 surrounding the jacket 39, strength member 48 surrounds the conductor 38, cable jacket 42 surrounds the conductor 38 and a ripcord 54 between the strength member 48 and the jacket 42.

FIGS. 6–8 illustrate still another fiber optic cable 58 constructed according to the present invention. Fiber optic cable 58 has a fiber optic core formed by fiber optic jacket 36. The fiber optic jacket 36 and its core contains four optical fibers 46. Each optical fiber 46 is surrounded by a tight buffer 47. The buffered fibers are wrapped or surrounded by strength member 48. The strength member 48 is preferably a serve of aramid yarn. The remaining structure of the coaxial fiber optic cable as set forth in FIG. 1 wherein the inner electrical conductor 37 is concentrically wrapped or placed around the cylindrical fiber optic jacket 36, dielectric jacket 39 surrounds the conductor 37, the outer coaxial conductor 38 surrounds the jacket 39, a ripcord 54 is between conductor 37 and jacket 39, strength member 48 surrounds the conductor 38, cable jacket 42 surrounds the conductor 38 and a ripcord 54 is between the strength members 48 and the jacket 42.

FIGS. 9–11 illustrate still another coaxial fiber optic cable 59. Fiber optic cable 59 has a fiber optic core formed by fiber optic jacket 36. In FIGS. 9–11 the fiber optic jacket 36 and its core 32 contains a central strength tube 51 made of a thermoplastic topcoated or bare fiberglass epoxy rod (FGD). Surrounding the strength tube 51 are a plurality of buffer tubes 49. For illustration purposes, six buffer tubes 49 are shown. Within each buffer tube 49 there are 1 to 12 optical fibers 52 contained in loose buffer gel 45 or each fiber 52 has a buffer coating or in some instances, a tight buffer. A strength member 53 surrounds the buffer tubes 49 and the optical fiber jacket 36 surrounds and contacts the strength member 53. The strength member 53 as shown is braided or served aramid yarn or braided or served aramid yarn with fiberglass epoxy rods. The fiber optic jacket 36 is also constructed with a ripcord 54. Therefore, the cable 59 has three ripcords 54. The remaining structural features are as set forth in FIG. 1. That is, inner conductor 37 is placed around jacket 36, dielectric jacket 39 surrounds the conductor 37, the outer coaxial conductor 38 surrounds the jacket 39, a ripcord 54 is between conductor 37 and jacket 39, strength member 48 surrounds the conductor 38, cable jacket 42 surrounds the conductor 38 and a ripcord 54 is between the strength member 48 and the jacket 42.

Referring to FIGS. 12–14, another coaxial fiber optic cable 60 is shown that has a similar construction as cable 59 of FIGS. 9–11 except an additional cylindrical jacket 55 is used to give the cable additional strength. The additional jacket 55 also has a fourth ripcord 54. The additional jacket 55 surrounds the buffer tubes 49 and the strength member 53 is concentrically sandwiched between the buffer tube's two jackets 36 and 55. The jacket 55 maybe made from the same material as jacket 36. The remaining structural features are as set forth in FIGS. 9–11. That is, buffer tubes 49 each carry in a plurality of optical fibers 52, inner conductor 37 is placed around jacket 36, dielectric jacket 39 surrounds the conductor 37, the outer coaxial conductor 38 surrounds the jacket 39, a ripcord 54 is between conductor 37 and jacket 39, strength member 48 surrounds the conductor 38, cable jacket 42 surrounds the conductor 38 and a ripcord 54 between the strength member 38 and the jacket 42.

Referring to FIGS. 15–17, there is illustrated still another coaxial fiber optic cable 60A. The fiber optic cable 60A has a fiber optic core formed by fiber optic jacket 36. The fiber optic core contains two optical fibers 57 each covered with a tight buffer 58 which may be made from polyvinylchloride (PVC). The buffered optical fibers are each wrapped with a strength member 58A and then each is covered with a breakout jacket 61. The strength member 58A is preferably aramid yarn or aramid yarn with fiberglass epoxy (FGE) rods. The jackets 61 and 36 may be made from the same material. Fillers 62 made of FGE are placed in the core to provide the core 32 with a substantially cylindrical shape. An appropriate optional polyester tape 63 is wrapped around the fillers 62 and breakout jackets 61 to provide, if needed, a substantially cylindrical core. The jacket 36 has a rip cord 54. FIG. 17 illustrates the polyester tape 63 and the jacket 36. This is not the relative dimensions of the two items, but this is only set forth to show the two distinct coverings 36 and 63. The remaining structural features are as in FIG. 1. That is, inner conductor 37 is wrapped around jacket 36, dielectric jacket 39 surrounds the conductor 37, the outer coaxial conductor 38 surrounds the jacket 39, a ripcord 54 is between conductor 37 and jacket 39, strength member 48 surrounds the conductor 38, cable jacket 42 surrounds the conductor 38 and a ripcord 54 is between the strength member 38 and the jacket 42.

Referring to FIGS. 18–20, this structure is similar to FIGS. 15–17 except the fillers 62 are not shown. FIGS. 18–20 show a 12 optical fibers 57 each with a tight buffer 58, strength member 58A and breakout jacket 61 whereas FIGS. 15–17 show two optical fibers 57. The cable also has the conductor 37 surrounding jacket 36, dielectric jacket 39 surrounds the conductor 37, the outer coaxial conductor 38 surrounds the jacket 39, a ripcord 54 is between conductor 37 and jacket 39, strength member 48 surrounds the conductor 38, cable jacket 42 surrounds the conductor 38 and a ripcord 54 is between the strength member 78 and the jacket 42.

FIGS. 21–23 and 24–26 are again variations of FIGS. 15–17 showing respectively 12 and 24 optical fibers in their respective cores formed by jacket 36. The central members 51 in each are sized for the particular number of optical fibers 34.

The structure of FIGS. 21–23 has one optional polyester tape 63 wrapped around all of the optical fiber members. The optical fiber member is the fiber 34, buffer 35, strength member 51 and breakout jacket 61 whereas the structure of FIGS. 24–26 have two coaxial polyester tape wraps 63.

As in FIGS. 1 and 2, the embodiments of FIGS. 22–26 all have a first coaxial electrical conductor 37 surrounding the fiber optic core jacket 36 and a second coaxial electrical conductor 38 radially separated from the first coaxial conductor by a dielectric 39.

The coaxial construction between the coaxial conductors 37 and 38 in all of the embodiments is calculated by the standard coaxial cable impedance, capacity and attenuation equations.

A lightspeed trioptical extension cord is made with a fiber optical core 32 as shown in FIGS. 1 and 2 wherein it has a pair of 62.5 micron optical fibers each having a buffer. The pair of optical fibers are covered by aramid yarn which provides impact resistance. The aramid yarn is covered by a first jacket of polyvinylchloride. An inner coaxial bare copper braid covers the first jacket. A low dielectric layer circumferentially covers the inner coaxial bare copper braid to provide abrasion resistance and insulation. An outer bare copper braid coaxial with the innerbraid and the fiber optic core covers the dielectric layer.

A final jacket of polyvinylchloride or polyurethane contacts and covers the outer bare copper braid. The fibers are Fiber Optic Distributed Data Interface fibers.

In the cable of the present invention, the inner electrical conductor 37 surrounds fiber optic core jacket 36 and extends longitudinally within and parallel to the length of the cable. Likewise, outer electrical conductor 38 surrounds and extends in parallel relation to inner electrical conductor 37. Outer electrical conductor 38 is coaxial to inner electrical conductor 37. Similarly, inner and outer electrical conductors 37 and 38 are configured in a triaxial construction with fiber optic core.

In use, the cable combines electric power delivery or electric analog data and high speed fiber optic data conduction in a single cable construction. The coaxial copper conductors allow for the transmission of high frequency sine or square wave alternating current (AC). Specifically, the alternating current is completely contained within the cable structure as it travels in the area between inner conductor 37 and outer conductor 38 from one end of the cable (AC in) to the opposite end of the cable (AC out) Highspeed fiber optic data is delivered through the optical fibers in the fiber optic core of the cable.

Therefore, it should be recognized that, while the invention has been described in relation to a preferred embodiment, those skilled in the art may develop a wide variation of structural details without departing form the principles of the invention. Therefore, the appended claims are to be construed to cover all equivalents falling within the true scope and spirit of the invention.

The invention claimed is:

1. A coaxial fiber optic cable comprising:

a substantially cylindrical first jacket, said first jacket defining a fiber optic core;

a transmission medium located in said core, the core contains at least a plurality of optical fibers, each optical fiber has a buffer thereon, a core strength means positioned between said plurality of buffered optical fibers and said first jacket;

said core strength means circumferentially surrounds said plurality of buffered optical fibers;

a substantially cylindrical inner electrical conductor coaxially surrounding said first jacket;

a substantially cylindrical outer electrical conductor coaxially surrounding said inner conductor and radially spaced from said inner conductor;

said inner and outer conductors being metal braid;

a dielectric layer separating said inner and outer conductors; and an outer jacket surrounding said outer electrical conductor and enclosing said inner and outer conductors.

2. The cable of claim 1 wherein the buffered optical fibers are tight buffered optical fibers.

3. A coaxial fiber optic cable comprising:

a substantially cylindrical first jacket, said first jacket defining a fiber optic core;

a transmission medium located in said core, said transmission medium including at least one optical fiber said at least one optical fiber is contained in a buffer tube, a core strength means positioned between said at least one optical fiber and said first jacket;

said core strength means is a plurality of strengthening fibers that circumferentially surrounds said buffer tube, a substantially cylindrical inner electrical conductor coaxially surrounding said first jacket;

said first jacket is substantially concentric with said buffer tube a substantially cylindrical outer electrical conductor coaxially surrounding said inner conductor and radially spaced from said inner conductor;

said inner and outer conductors being metal braid;

a dielectric layer separating said inner and outer conductors; and an outer jacket surrounding said outer electrical conductor and enclosing said inner and outer conductors.

4. A coaxial fiber optic cable comprising:

a substantially cylindrical first jacket, said first jacket defining a fiber optic core;

a transmission medium located in said core, said transmission medium including at least one optical fiber;

said at least one optical fiber has a tight buffer thereon, a core strength means positioned between said at least one optical fiber and said first jacket;

said core strength means circumferentially surrounds said at least one buffered optical fiber, a substantially cylindrical inner electrical conductor coaxially surrounding said first jacket;

said first jacket is substantially concentric with said core strength means;

a substantially cylindrical outer electrical conductor coaxially surrounding said inner conductor and radially spaced from said inner conductor;

said inner and outer conductors being metal braid;

a dielectric layer separating said inner and outer conductors; and an outer jacket surrounding said outer electrical conductor and enclosing said inner and outer conductors.

5. A coaxial fiber optic cable comprising:

a substantially cylindrical first jacket, said first jacket defining a fiber optic core;

a transmission medium located in said core, said transmission medium includes said core contains at least one buffer tube;

said at least one buffer tube contains a plurality of optical fibers, a core strength means positioned between said at least one optical fiber and said first jacket;

said core strength means circumferentially surrounds said at least one buffer tube, said core strength means being substantially concentric with said first jacket;

a substantially cylindrical inner electrical conductor coaxially surrounding said first jacket;

said first jacket is substantially concentric with said buffer tube a substantially cylindrical outer electrical conductor coaxially surrounding said inner conductor and radially spaced from said inner conductor;

said inner and outer conductors being metal braid;

a dielectric layer separating said inner and outer conductors; and an outer jacket surrounding said outer electrical conductor and enclosing said inner and outer conductors.

6. The cable of claim 5 wherein there are a plurality of buffer tubes.

7. The cable of claim 6 wherein the core contains a central tubular strength member and said buffer tubes surrounding said central tubular strength member.

8. The cable of claim 7 wherein in said core said buffer tubes are surrounded by a third tubular jacket and said third tubular jacket is circumferentially surrounded by said core strength means, and said first jacket being in contact with and substantially coaxially surrounding said core strength means.

9. A coaxial fiber optic cable comprising:

a substantially cylindrical first jacket, said first jacket defining a fiber optic core;

a transmission medium located in said core, said transmission medium in said core is a plurality of optical fiber means;

each optical fiber means has an optical fiber, a buffer on said optical fiber to provide a buffered optical fiber, a fibrous strength member wrapped around said buffered optical fiber and a breakout jacket around said fibrous strength member;

means to hold said plurality of optical fiber means together a substantially cylindrical inner electrical conductor coaxially surrounding said first jacket;

said first jacket is substantially concentric with said buffer tube a substantially cylindrical outer electrical conductor coaxially surrounding said inner conductor and radially spaced from said inner conductor;

said inner and outer conductors being metal braid;

a dielectric layer separating said inner and outer conductors; and an outer jacket surrounding said outer electrical conductor and enclosing said inner and outer conductors.

10. The cable of claim 9 wherein the optical fiber is a tight buffered optical fiber.

11. The cable of claim 10 wherein the core contains a central tubular member and said plurality of optical fiber means surrounds said central tubular member.

12. The cable of claim 9 wherein said transmission medium has a central tubular strength member.

13. The cable of claim 9 wherein said first and second conductors are selected from bare or coated copper braid.

14. The cable of claim 13 wherein the first and outer jackets are made of a thermoplastic or thermosetting elastomer such as PVC, PU or FRPU, etc;

said strengthening fibers are aramid fibers or a combination of aramid fibers and fiberglass epoxy fibers.

15. A coaxial fiber optic cable comprising:

a core which comprises a transmission medium, said transmission medium including at least one optical fiber conductor surrounded by one or more strengthening materials and defined by a first dielectric tubular jacket;

a first conductor surrounding said core, and a second conductor coaxial to said first conductor, said first and second conductors being triaxial with said core, said first and second conductors being separated by a dielectric means which extends between and in parallel relation to the length of the conductors, said first and second conductors being a copper braid, copper foil or combination of the two;

an overall aramid reinforcement layer in said core extending in parallel relation to said first conductor; and an outer dielectric jacket surrounding said dielectric means and enclosing said first and second conductors and said core.

* * * * *

UNITED STATES PATENT AND TRADEMARK OFFICE
CERTIFICATE OF CORRECTION

PATENT NO. : 5,557,698
DATED : September 17, 1996
INVENTOR(S) : Galen Gareis and Barry Thornton It is certified that error appears in the above-indentified patent and that said Letters Patent is hereby corrected as shown below:

Column 6, Line 55, delete "maybe" and insert --may be--.

Column 7, Line 22, delete "38" and insert --48--.

Column 7, Line 33, delete "78" and insert --48--.

Column 8, Line 24, delete "form" and insert --from--.

Signed and Sealed this

Fourteenth Day of January, 1997

Attest:

BRUCE LEHMAN

Attesting Officer

Commissioner of Patents and Trademarks